June 22, 1965  J. FLICHY  3,190,148
SPEED VARIATOR AND REDUCER APPARATUS
Filed July 22, 1963

INVENTOR
JACQUES FLICHY
By Linton and Linton
ATTORNEYS

United States Patent Office 3,190,148
Patented June 22, 1965

3,190,148
SPEED VARIATOR AND REDUCER APPARATUS
Jacques Flichy, Paris, France, assignor, by mesne assignments, to Ateliers Métallurgiques de Saint-Urbain, a corporation of France
Filed July 22, 1963, Ser. No. 296,778
Claims priority, application France, Aug. 23, 1962, 907,600, Patent 1,338,943
8 Claims. (Cl. 74—796)

This invention relates to drive transmission apparatus adapted to act simultaneously as a speed-variator and -reducer.

Conventional speed variator devices are operable to impart a controllably variable speed to an output shaft from an input shaft rotated at uniform speed. The variable speed of the output shaft however is, in such devices, of the same general order of magnitude as that of the input shaft.

In conventional speed reducers, on the other hand, the output shaft is rotated at a velocity substantially less than that of the input shaft, however the ratio of the two velocities is constant. Heretofore, when it was desired to drive an output shaft at a variable velocity considerably reduced with respect to the constant velocity of the input shaft, it was usually necessary to couple in tandem relation a reducer and a variator, thereby detracting from the overall efficiency of the drive transmission, and increasing installation and maintenance costs as well as space consumption.

Moreover, in cases where it was necessary to make available a zero output velocity a third unit, in the form of a clutch, was generally required.

It is an object of this invention to provide an improved drive transmission whereby an output shaft can be driven at a controllably variable angular velocity considerably lower than the velocity of an input shaft. Further objects include the provision of a variable speed reducer having excellent transmission efficiency, which will make available a wide range of accurately predeterminable output speeds including extremely low speeds down to zero output speed; will be relatively simple, compact, inexpensive to make and maintain. Other objects will appear.

Briefly, the invention in an important one of its aspects comprises a casing, an input shaft mounted for rotation with respect to the casing, an adjustable-throw excentric member driven in rotation by the input shaft, at least one disk member having an aperture mounted for free rotation about the periphery of said excentric member, friction means engaging a surface of the disk member for restraining the rotation thereof with respect to the casing, and coupling means rotatively connecting the disk member with the output shaft.

It is found that with an arrangement as thus described, the disk member is driven in bodily rotation with respect to the friction means and casing at an angular velocity proportional to the excentricity or throw of the excentric member, so that said angular velocity can be made as slow as desired by reducing the excentricity adjustment, and can be reduced to zero if said excentricity is itself nullified. A corresponding variable velocity can thus be imparted through the coupling means to the output shaft.

Excentricity adjustment of the excentric member can be provided for in any desired manner, and one convenient arrangement for that purpose is to provide said excentric member with a cylindrical bore rotatable about the periphery of another excentric member secured to the input shaft, whereby rotational adjustment of the outer excentric with respect to the inner excentric fixed to the shaft will adjust the excentric throw of the outer excentric with respect to the input shaft.

For drivingly coupling the disk member with the output shaft, the disk member may be mounted on a tubular shaft for rotation therewith, the tubular shaft in turn being mounted for free rotation around the excentric member, and said tubular shaft being coupled with the output shaft through any suitable coupling device capable of providing rotational drive between two shafts whose axes are parallel but laterally displaced from each other, such as an Oldham's coupling.

The input shaft can then be supported in a first bearing within the casing and another bearing in an end recess formed within the output shaft, which in turn may be supported in spaced bearings within the casing.

In one desirable embodiment of the invention, there are provided a set of axially spaced disk members, at least some of which are axially displaceable with respect to one another and the casing, and the friction means include a set of axially spaced clamping rings, axially interspersed with the disk members, said ring members being non-rotatable with respect to the casing and some at least of said rings being axially displaceable, and spring means being provided for forcing the assembly of disk and ring members into tight frictional engagement with respect to one another. The disk member or members preferably have somewhat conical, rather than flat, side surfaces and the disk members are formed with complementary conical surfaces for engagement with said side surfaces of the disk members.

An examplary embodiment of the invention will now be described for purposes of illustration but not of limitation with reference to the accompanying drawings, wherein.

Figure 1:
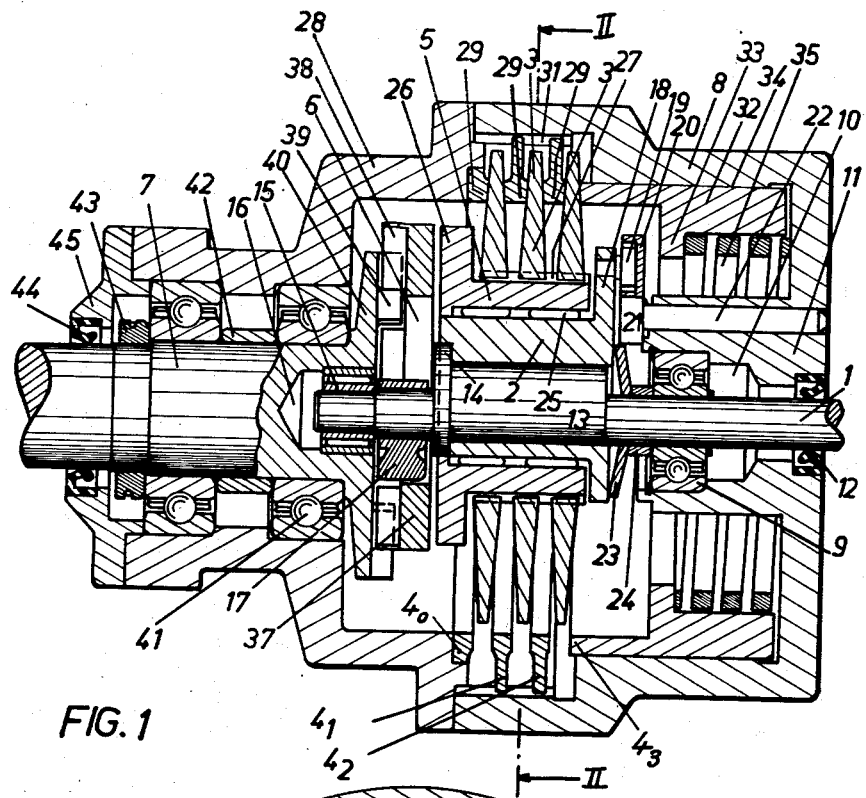
FIG. 1 is an axial sectional view of the improved variable-speed reducer.

The apparatus shown generally comprises an outer casing 8, an input or drive shaft 1 mounted for rotation in the casing, and an output or driven shaft 7 mounted for rotation in the casing in axial alignment with the input shaft 1. Input shaft 1 is supported in a ball bearing 9 received in a bore 10 formed in an inner end casing portion 11 of casing 8. A conventional annular seal 12 surrounds shaft 1 at its egress from the casing. The shaft 1 is formed with an inner excentric portion 13 followed by an abutment flange 14, and its free end beyond flange 14 is mounted in a needle bearing 15 received in an end recess 16 formed in the adjacent end of driven shaft 7.

An excentric balancing weight 17 is attached to shaft 1 between flange 14 and bearing 15 for dynamically balancing the weight of the excentric components revolving with shaft 1 as presently described.

An outer excentric member 2 surrounds the cylindrical periphery of inner excentric 13 for free rotational adjustment with respect to the latter and to shaft 1. The outer excentric member 2 has a radial arm 18 carrying a roller 19 pivoted about an axis parallel to that of shaft 1 and engaging a groove 20 formed in an arm 21 rotatable from outside the casing as by means of a suitable tool engageable with the outer end of a rod 22 rotatably extending through the end wall of the casing and having arm 21 secured to its inner end. It will be understood that with this arrangement the relative angular setting of the outer excentric member 2 with respect to the inner excentric 13 and to drive shaft 1 can be set by acting on adjusting rod 22, thereby to preset the excentric throw of outer excentric member 2 with respect to the axis of input shaft 1; thereafter the excentric member 2 will be driven in rotation by shaft 1 with the amount of excentric throw as thus preset. The arrangement described enables modifying the excentric throw (and hence the output speed as will later become apparent) during operation of the device. The outer excentric member 2 is urged into abutment (leftwardly as shown) against stop flange 14 by the action of a spring washer 23 surrounding shaft 1 and engaging at one end the right end surface of excentric member 2 and at its other end a spacer ring 24.

Figure 2:
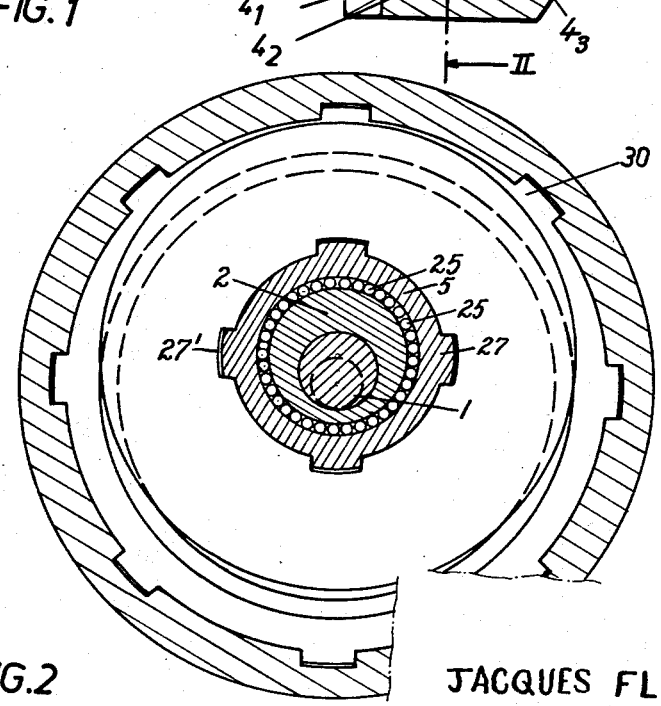
FIG. 2 is a cross sectional view on line II—II of FIG. 1.

A tubular shaft 5 rotatably surrounds the outer surface of excentric member 2, with needle bearings 25 being interposed between the adjacent cylindrical surfaces of tubular shaft 5 and member 2. The tubular shaft 5 is provided with a flange 26 at its one (left-hand) end and its outer surface is provided with angularly spaced longitudinally extending splines 27, four in number in this embodiment as shown in FIG. 2. A set of disk members 3, three in number herein, are mounted around tubular shaft 5 for rotation therewith but free axial displacement with respect thereto, by means of longitudinal grooves or keyways 27' formed in the periphery of an inner bore of each of said disk members, slidably engaging the respective splines 27 (see FIG. 2). The disks 3 have an outwardly tapered shape in cross section, so that their side surfaces are somewhat conical as shown.

A set of ring members 4, four in number herein, are mounted within the casing in axially interspersed relation with the disks 3. The set of ring members 4 include, from left to right: a fixed ring member $4_0$ seated in a recess of the casing and having a projecting side 29 with a conical surface complementary to that of the adjacent side of the adjacent disk 3 for close engagement therewith; a slidable ring member $4_1$ having angularly-spaced longitudinal splines 30 projecting from its outer periphery and engaging complementary keyways 31 formed in the side wall of casing 8, the rings $4_1$ having opposite projecting sides 29 with conical surfaces for engagement with the adjacent sides of both disks 3 between which said ring $4_1$ is positioned; a second slidable ring member $4_2$ formed exactly similarly to ring $4_0$ so as to be engageable with the adjacent conical sides of the two further disks 3 between which said ring $4_2$ is positioned; and at last axially slidable ring member $4_3$ which actually constitutes the annular end portion of a sleeve 32 slidable in casing 8 as presently described, and having a conical surface engageable with the adjacent side of the last or rightmost disk member 3.

Sleeve 32 is formed with an inner flange 33 providing an annular seat for one end of a powerful compression spring 35 the other end of which is seated against the inner end surface of casing 8. The spring 35 acts by way of pressure sleeve member 32 to clamp the set of axially displaceable ring members $4_3$, $4_2$, and $4_1$ and the axially displaceable disk members 3 interspersed therewith against the fixed end ring member $4_0$ abutted against the wall of casing 8.

The output shaft 7 is supported in a leftward extension or cover member 28 of casing 8 by way of the spaced ball bearings 41 separated by spacer ring 42 and retained by a blocking ring 43 mounted in a groove of shaft 7 for engagement with the outer one of bearings 41. An annular seal 44 is associated with the egress of shaft 7 from the end cap or cover member 43 of the casing.

A rotational drive coupling generally designated 6 is provided between output shaft 7 and the excentrically mounted tubular shaft 5. This coupling drivingly interconnects the afore-mentioned flange 26 provided at the outer end of tubular shaft 5 with a flange 40 provided at the inner end of the output shaft 7, and may be of any conventional type for drivingly interconnecting a pair of shafts having parallel but laterally displaced axes, such as an Oldham's type coupling. As shown, the coupling includes an intermediate plate or flange 28 having mutually orthogonal splined connections, such as 38–39, with flanges 40 and 26 respectively.

The apparatus described operates as follows:

When input shaft 1 is rotated e.g. at uniform speed, the excentric member 2 is rotated at the same speed about the axis of shaft 1, with a wobble motion whose amplitude is determined by the degree of excentric throw for which the outer excentric member 2 has been set. This wobbling motion is transmitted to the disk members 3 while their bodily rotation with the excentric member and shaft 1 is restrained owing to the clamping thereof by the ring members 4. Every point of each disk member 3 is thus constrained to describe a small circumference about a fictive centre of rotation, with the radii of all the circumferences having a common value corresponding to the adjusted throw of excentric member 2. The net effect is a bodily rotation of the disks 3 at a rate considerably lower than that of the input shaft 1, and which rate is proportional to the adjusted excentric throw of member 2. Thus, if the excentric throw is adjusted to zero value, so that the outer circumference of member 2 is coaxial with the input shaft 1, then it is clear from the foregoing that the disks 3 will remain completely stationary. The rotation of the disks 3, if present, is transmitted through the coupling 3 to the output shaft 7 which is thus rotated at a velocity substantially lower than the velocity of input shaft 1, and porportional to the excentricity setting of member 2.

It will thus be apparent that the invention has provided a variable speed reducer, or speed variator, of simple, compact and rugged design, having only a small number of moving parts, easy and economical to construct and maintain, and smooth, accurate and efficient in operation. It will also be evident that a wide diversity of modifications may be introduced into the single embodiment shown and described without exceeding the scope of the invention.

Thus, the adjustable-throw excentric arrangement may assume designs other than the one described as comprising an outer excentric adjustably rotatable around an inner excentric.

The arrangement shown wherein the disk members 3 are slidably but non-rotatably mounted around a tubular shaft freely rotatable around the excentric member and coupled by way of an Oldham's or other suitable type of coupling to the output shaft, is especially desirable since it enables the drive coupling to be positioned close to the geometric axis of the drive shaft and improves the efficiency of the transmission especially when the input and output shafts are aligned, as here shown. However various other arrangements may be devised, including arrangements wherein the input and output shafts are not aligned, and others wherein one of the shafts extends completely within the other shaft provided tubular.

The number of torque-transmitting disks such as 3, and the number of cooperating friction ring members such as 4, may be altered depending especially on the torque required to be transmitted through the apparatus. Various other changes and modifications will occur to those familiar with the art after having been made aware of the teachings herein disclosed.

What I claim is:

1. Speed variator apparatus comprising a casing, an input shaft and an output shaft mounted for rotation with respect to the casing, an adjustable-throw excentric member driven in rotation by the input shaft, at least one disk member having an aperture mounted for free rotation about the excentric member, friction means engaging a surface of the disk member for restraining rotation therewith with respect to the casing, and coupling means rotatively connecting the disk member with the output shaft, whereby adjusting the throw of said excentric member will vary the ratio of input shaft velocity to output shaft velocity, and means for dynamically balancing said excentric member and parts carried thereby about the geometric axis of the input shaft.

2. Speed variator and reducer apparatus comprising a casing, an input shaft and an output shaft mounted for rotation with respect to the casing, an excentric provided on the input shaft and means for adjustably varying the excentric throw thereof relative to the input shaft axis, a tubular shaft mounted for free rotation about said excentric, at least one disk member having an aperture therein and cooperating keyway means in the member and on the tubular shaft for mounting the disk member for non-rotatable axially-displaceable movement with respect to the tubular shaft, at least one ring member having a side surface frictionally engageable with a side surface of said disk member, means for non-rotatably axially-slidably mounting said ring member in said casing and pressure means for pressing said ring and disk members into mutual engagement for restraining the rotation of said disk member and tubular shaft relative to the casing, and coupling means rotationally connecting the tubular shaft with the output shaft, whereby adjusting the throw of said excentric will vary the input to output shaft speed ratio.

3. The apparatus claimed in claim 2, wherein said input and output shafts are mounted in axial alignment.

4. The apparatus claimed in claim 3, wherein said coupling means comprise an Oldham's type coupling interconnecting said tubular shaft and output shaft.

5. The apparatus claimed in claim 2, wherein said pressure means comprise a spring acting between said casing and ring member.

6. The apparatus claimed in claim 2, wherein said disk and ring members have complementary interengageable conical surfaces.

7. The apparatus claimed in claim 3, wherein one of said input and output shafts has an end portion rotatably supported in an end recess of the other of said shafts.

8. The apparatus claimed in claim 2, wherein an end one of said ring members is formed at the end of an annular housing slidable in said casing, and said pressure means comprises a compression spring received in said housing and having one end engaging an inner annular surface of said housing and its other end engaging a inner annular surface of said casing.

References Cited by the Examiner
UNITED STATES PATENTS

| | | | |
|---|---|---|---|
| 3,020,782 | 2/62 | Sacchi | 74—796 |
| 3,099,927 | 8/63 | Anderson | 74—796 |

DON A. WAITE, *Primary Examiner.*

BROUGHTON G. DURHAM, *Examiner.*